(12) United States Patent
Gilstrap et al.

(10) Patent No.: US 9,031,983 B2
(45) Date of Patent: May 12, 2015

(54) SYSTEM AND METHOD FOR PROVIDING A STANDARDIZED DATA SHARING PLATFORM

(75) Inventors: Samuel D. Gilstrap, Arroyo Grande, CA (US); Bret Prawitt, Arroyo Grande, CA (US); David Dalrymple, Atascadero, CA (US); Kyle Barker, Fresno, CA (US)

(73) Assignee: AssetLogic Group LLC, San Luis Obispo, CA (US)

( * ) Notice: Subject to any disclaimer, the term of this patent is extended or adjusted under 35 U.S.C. 154(b) by 0 days.

(21) Appl. No.: 13/399,254

(22) Filed: Feb. 17, 2012

(65) Prior Publication Data

US 2012/0215812 A1    Aug. 23, 2012

Related U.S. Application Data

(60) Provisional application No. 61/444,577, filed on Feb. 18, 2011.

(51) Int. Cl.
*G06F 7/00* (2006.01)
*G06Q 10/10* (2012.01)
*G06F 17/30* (2006.01)

(52) U.S. Cl.
CPC .......... *G06Q 10/10* (2013.01); *G06F 17/30238* (2013.01)

(58) Field of Classification Search
CPC .................................................. G06F 17/30238
USPC .......................................................... 707/781
See application file for complete search history.

(56) References Cited

U.S. PATENT DOCUMENTS

2003/0195904 A1 * 10/2003 Chestnut et al. .............. 707/204
2006/0184452 A1    8/2006 Barnes et al.
2010/0274710 A1   10/2010 Misraje et al.

OTHER PUBLICATIONS

International Search Report dated May 25, 2012 (Three (3) pages).

* cited by examiner

*Primary Examiner* — Ajith Jacob
(74) *Attorney, Agent, or Firm* — Crowell & Moring LLP

(57) ABSTRACT

A standardized platform, implemented in a secure web-based environment, enables the sharing of data between different individuals, institutions and even industries. Data is shared between members of the platform in accordance with defined data objects with specified relationships and permissions which are managed, accessed and modified by members using the platform. Such data objects have defined relationships to entities and other data objects, and are controlled by designated preferred owners, which can vary over time.

18 Claims, 12 Drawing Sheets

| | Multi family Residence |
|---|---|
| LOAN # 122372 | Sales Status: Listed |
| ADDRESS | ASSET INFORMATION |
| | ASSET CONTACTS |
| ● MAP | DOCUMENTS |
| DESCRIPTION | PICTURES |
| Partially constructed 25 unit condominium development. Construction approximately 85% complete. Permit is active and expires 8/20/10. Tentative parcel map is current until 11/1/10. Erosion control required as well as several health and safety concerns require attention. | PUBLIC PAGE SNAPSHOT |
| | DISPOSITION |
| | ⊞ SHARE LISTING |

09-08-2010

| SUMMARY | ASSET DETAILS | LOAN DETAILS | INSURANCE | OWNERSHIP |
|---|---|---|---|---|

⊞ ADD EMPTY LOAN

▽ LOAN #: 122372    View Note Sale    hide all show all

| Borrower | | Index | |
|---|---|---|---|
| Loan Status | Non-Performing | Index Margin | 1.00 |
| Lien | 1st | Accrual Method | 365 |
| Unpaid Balance | $15,000,000 | Participation | |
| Original Balance | $15,000,000 | Participation Percent | 0.00% |
| Maturity Date | 08/14/2013 | Impairment Reserve | 0 |
| LTV Ratio | % | Risk Rating | 6 |
| Interest Rate | 5.00 % | Borrower Bankruptcy | Yes |
| | | Guarantor Bankruptcy | Yes |
| | | Potential Guaranty Recovery Evaluation | Yes |
| | | Potential Guaranty Recovery | No |
| | | Past Due (1-29 Days) | 0 |
| | | Past Due (30-59 Days) | 0 |
| | | Past Due (60-89 Days) | 0 |
| | | Past Due (90 Days or Greater) | 0 | ns # SYSTEM AND METHOD FOR PROVIDING A STANDARDIZED DATA SHARING PLATFORM

CROSS-REFERENCE TO RELATED APPLICATION

This application claims the benefit of U.S. Provisional Application No. 61/444,577, filed Feb. 18, 2011.

FIELD OF THE INVENTION

The present invention relates to data sharing, and more particularly a novel platform across which users may manage, securely access and share information, data files and workflow as a function of the possible roles that such users may assume with respect to the underlying assets and entities to which the data relates.

BACKGROUND

With the increasing complexity of the financial markets and associated regulations, there is an ever increasing need for efficient management and sharing of information. As there is an increased ability to more efficiently manage and share information, there is likely to be a corresponding increase in the ability for a company/industry to operate in a more value maximizing manner. For example, efficient management and seamless sharing of information can increase operational capacity, reduce costs, increase organizational velocities, provide added transparency when needed or desired, and facilitate the regulatory compliance process.

However, there is currently a lack of a platform which is capable of addressing such information sharing and access needs in a cross-company and even cross-industry standardized manner. Currently, individuals, companies and industries that communicate and transact together are essentially all working on independent platforms, thereby impeding the efficiency and transparency of their respective interactions. Electronic systems and tools are designed to work within an organization (or even portion of an organization), and do not allow for the seamless sharing of information outside of the organization or industry in a secure and efficient manner.

Another issue facing industries, such as the real estate, insurance, finance, etc., is an inability to assess one's risk due to imperfect information. This is mostly due to the fact that different companies within the same industry often employ silo technologies which are incapable of providing a means to securely and seamlessly share information with other companies having a need or desire for the information. Since the risk associated with an asset can span literally dozens, hundreds or thousands of organizations all interlinked by their risk exposure to the particular asset, there is a pronounced unsatisfied need in the art for a standardized data sharing platform through which entities may transact with one another and directly share the data and documents associated with such transactions.

BRIEF SUMMARY OF THE INVENTION

Disclosed and claimed herein is a platform and method for standardized sharing of data. This platform includes a network, a database and a server which is configured to define a plurality of data objects for both entities and non-entities, wherein each of the data objects for entities comprises information that corresponds to specific entity types, while each of the data objects for non-entities comprises information that corresponds to specific tangible items. The server is further configured to populate an asset object, from among the plurality of data objects, with information corresponding to an underlying asset which has been provided by a user of the platform, wherein the user corresponds to a preferred owner of the asset object by virtue of having responsibility to maintain information relating to the underlying asset.

The server is further to define relationships between the asset object, the user and one or more of the other plurality of data objects, including at least one entity object, wherein said relationships are defined as a function of one or more commercial arrangements between the user and one or more other entities, wherein the at least one entity object corresponds to the one or more other entities. Finally, the server is configured to allow one or more other entities the right to access said asset object over the network and in accordance with said defined relationships and with permissions defined by said user.

Other aspects, features, and techniques of the invention will be apparent to one skilled in the relevant art in view of the following detailed description of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 7 depicts one example of a graphical user interface configured to access one or more aspects of the standardized platform environment, as disclosed herein;

DETAILED DESCRIPTION OF EXEMPLARY EMBODIMENTS

Overview of the Disclosure

Figure 1:
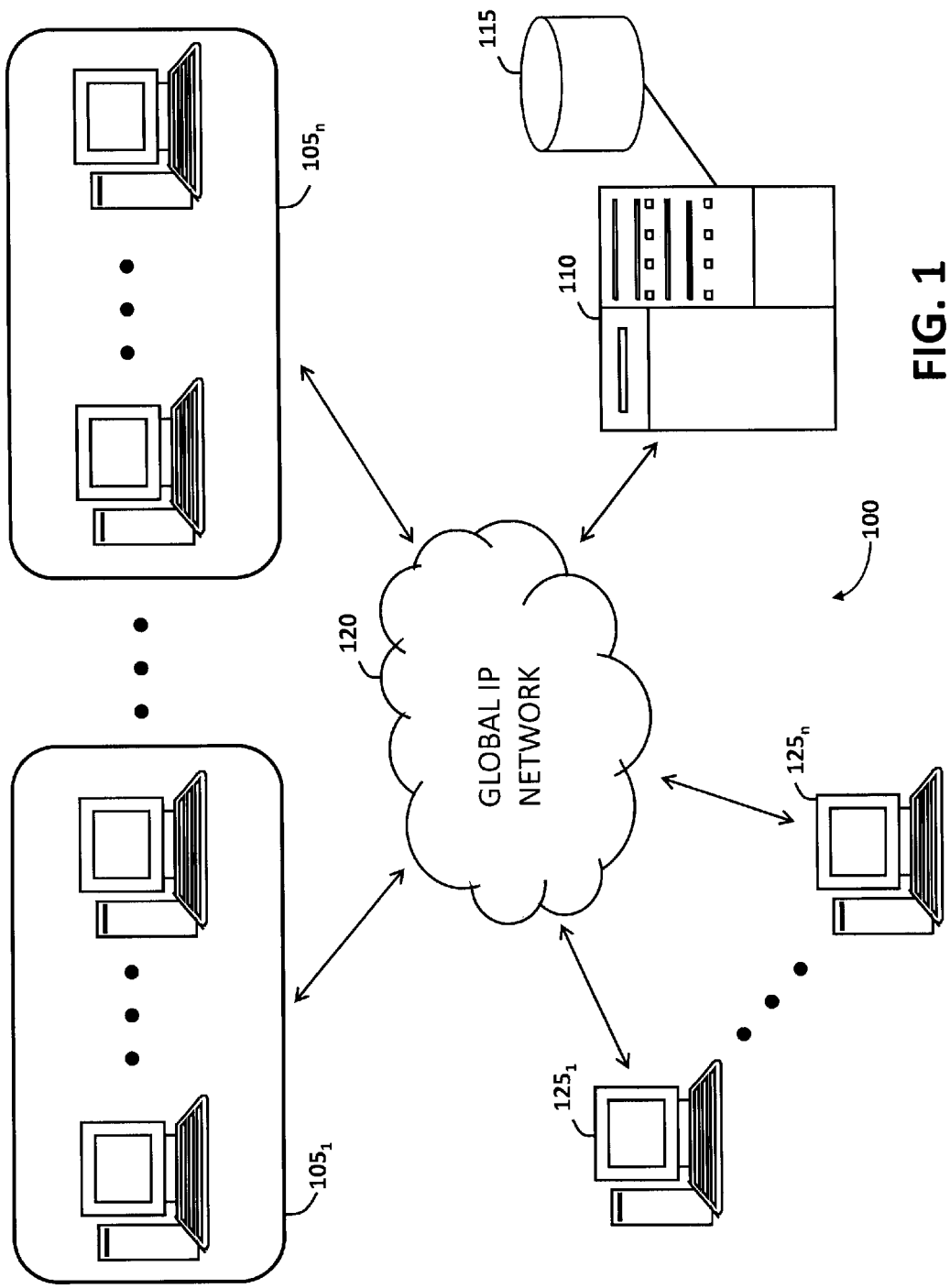
FIG. 1 is a simplified block diagram of an exemplary network architecture for the standardized data sharing platform disclosed herein, which is configured in accordance with the principles of the invention.

The following disclosure relates to a novel, standardized platform, which may be implemented in a secure web-based environment, across which institutions and individuals may access and share information, and which may further transact between organizations and industries. One aspect of the invention is to provide a plurality of standard objects with specified relationships and permissions that are applied between specified users and such objects. Such objects are managed, accessed and modified using a universal web-based platform that facilitates the secure sharing of data and documents, web-based communication, financial transactions and workflows across a wide range of user types. Such objects can be defined as entity objects, e.g., borrower, insurer, guarantor, bank, investor, asset manager, etc. Additionally, the defined objects may include non-entity objects, such as assets, loans, insurance policies, etc.

All objects are information sets, and may be defined to have certain fundamental characteristics, including for example one or more of the following:

Data fields
Files (pictures, documents, etc)
Contacts
Relationships with other objects
Permission levels.

All objects (and hence the information in them) relate to something in the real world, such as an underlying asset, a loan, a bank, an appraisal, etc. Each object has a preferred "owner" and numerous non-preferred owner. For example, in the case of an "asset holder," this owner may have the ability to create a loan object, an insurance policy object, etc. Such objects may be administered by a preferred owner, although such owner may grant object access rights and/or additional ownership rights to any number of other non-preferred owners.

In some situations, identical objects (e.g., an asset) may be owned by separate users (e.g., asset holder, insurance company). In such cases, the platform may be configured to identify such duplicates and combine the objects so that they can be properly accessed and shared.

Users of the novel platform are considered members of the specific online community in which they are transacting business together. Data within the platform is owned by such member organizations and individuals. Access and consent mechanisms for member organizations and member individuals to share with other members of the platform is preferably controlled by the owners of the underlying information. Members that are granted permissions to objects from other members will have the ability to exercise those permissions within the same platform. Members can aggregate information across multiple member organizations that they have permissions. For example, a regulatory body can be granted permissions from multiple institutions and report on and analyze information across multiple institutions.

Another aspect of the disclosure is to provide permission logic which flexibly controls the explicit and implicit access and consent mechanisms for the universal platform. All data fields, document types, and objects in the platform are individually permissionable. This allows creation of an infinite number of permissions, thus allowing the owner of information to share only that information that they desire with another member.

It should further be appreciated that members with adequate permissions may also have the authority to combine similar object types (e.g., loans, assets, etc.) into "object groups" for convenience in setting permissions, while members themselves can be grouped into "member groups."

Permissions are granted by linking specific members to specific objects groups according to a permissioning set. Permissioning sets may be categorized and named based on defined roles. For example, various permissioning sets for an asset manager can be created and labeled "Asset Manager 1, Asset Manager 2, or Asset Manager 3".

Unlike traditional web-based platforms where administrators have the ability to grant only user access permissions, the novel platform disclosed herein is based, at least in part, on the concept of ownership of information. In short, an authorized member can grant to another member ownership rights over shared information. As appropriate to a business relationship or transaction, multiple parties can co-own the same information. Moreover, once ownership rights to information have been granted, such rights cannot be revoked, just as ownership of real property cannot be revoked once transferred.

Another aspect of the disclosure is that object types will be defined with a preferred owner. For example, an asset holder can own a loan object, while a lender can also own a loan object. However, in this case the lender would be the preferred owner of the loan object because the lender is the entity which is obligated or in the best position to maintain the object's information, e.g., loan balance.

In certain embodiments, the platform may be configured to alert members that each appear to own a duplicate of the same object and give them the opportunity to merge this object with co-ownership and a declaration of a preferred owner.

In accordance with the principles of the invention, ownership of objects may vary over time, and is described in more detail below.

Still another aspect of the present disclosure relates to ensuring data integrity and accuracy. To that end, only authenticated members may take any actions in relation to the data and documents in the platform, and no information is permitted to be anonymous.

It should further be appreciated that the platform may be a 'context' platform in the sense that objects may be created with a standard object syntax. This standard syntax may allow members to create new object types that are capable of relating with other existing objects on the platform. The creation of such new objects may include data fields, document and image types, known relationship structures to other objects, permission sets, workflows, etc. In the case of new object workflows, the standard syntax may allow members to create new workflows that are capable of relating with objects and members within the platform. Standard editing and creation tools for new objects, permissions, workflows, etc. may similarly be provided to developers. Members that create new objects and/or workflows for the platform may own and even market them to other members on the platform.

Still another aspect of the disclosure is to provide a communications platform through which members may securely communicate with other members. Communications such as email, instant message, voice and video conference may be recorded within the platform, and even related to the objects, workflows and members, as may be specified by the authorized members.

The platform disclosed and claimed herein may further comprise a services marketplace through which members may provide services to other members in the platform. For example, if a member needs a valuation performed on a piece of collateral, the member can request the services of other members that can provide the valuation information through the platform.

To facilitate the provision of the service, the member servicer may be given limited and temporary object permissions by the requesting member service. Payment for any services rendered may also be processed through the platform.

In addition to facilitate the marketing of newly-created objects and member services, the novel platform may further be configured to facilitate the purchase of third party data and to associate such data to particular objects within the platform. Similarly, members can post their owned objects for sale on one or more marketplaces existing on the platform. For example, real estate, loans, securities, etc. can be purchased. Sale of objects between member includes a transfer of ownership of objects between members.

Another aspect of the platform relates to the concept of workflows. In particular, an information owner may start a workflow which, when initiated, grants ownership to a third party which is sufficient to perform a requested task, e.g., perform an appraisal, audit, etc. Once the third party has completed the requested task, they may retain ownership to view only the information/product relating to the task performed by the third party, but not to view any future information relating to the object in question.

Additionally, a transition between workflow states can create new objects, create temporary permissions, create permanent ownership of permissions, and transfer ownership between participants. Workflow transitions may have pathways designated as alternatives in order to prevent "roadblock" conditions that render many workflows ineffective. Transitions can be executed by a properly permissioned secondary party, such as a supervisor or secretary. Although the workflow may proceed, the record of these transitions may be specially marked. This marker could be used for reporting, second pass review, replay when the transition designee resumes their capacity, or other purposes.

Finally, the platform may be configured to enable members to report on objects that they have permission to own or access. Such reporting may occur across multiple organizations, industries and demographics between members.

The principles set forth herein should be interpreted as relating generally to any industry or company that shares information and transacts within/across such industry and/or company. Specifically, the platform disclosed herein enables business professionals in all lending, real estate investment, financial services, insurance, real estate brokerages, regulatory industries, brokerages, consulting and any other asset-based business, whether tangible or non-tangible, to communicate, share information and transact financially in a single, secure platform.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, A, B or C means any of the following: A; B; C; A and B; A and C; B and C; A, B and C. An exception to this definition will occur only when a combination of elements, functions, steps or acts are in some way inherently mutually exclusive. Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the invention are essentially the code segments to perform the necessary tasks. The code segments can be stored in a processor readable storage medium, which may include any medium that can store information. Examples of the processor readable mediums include an electronic circuit, a semiconductor memory device, a read-only memory (ROM), a flash memory or other non-volatile memory, a floppy diskette, a CD-ROM, an optical disk, a hard disk, etc.

Exemplary Network Overview

As depicted in FIG. 1, a simplified system diagram is provided for standardized data sharing platform 100 configured to implement one or more aspects of the invention. As shown, the platform 100 includes one or more member organizations $105_1$-$105_n$. While in one embodiment, the member organizations 105 may correspond to a single company or business, it should equally be appreciated that the member organizations 105 may relate to other organization levels as well, e.g., country, institution, industry, etc. Each member organization 105 may include one or more work stations. In certain embodiments, the work stations may be configured to execute software which generates a graphical user interface (GUI) configured to access a standardized data sharing platform server 110 and associated platform database 115 over a global network 120 (e.g., the Internet). The platform server 110 may be coupled to or otherwise in electronic communication with the platform database 115, in which member and object data is stored and processed. It should be appreciated that the platform server 110 may be implemented as a single server or as several interlinked servers.

The standardized data sharing platform 100 of FIG. 1 further depicts the fact that one or more individual work stations $125_1$-$125_n$ which may be similarly configured to access the standardized data sharing platform server 110 and associated platform database 115 over a global network 120.

References below to any actions taken by users or members of the platform should be interpreted to correspond to individuals, such as at any of the various work stations of any member organization 105 or individual work stations 125, accessing the platform server 110 and platform database 115 via the network 120. Additionally, all information provided by such users/members, all changes or other interactions by such users/members, are performed via client-side application which is configured to interact with the platform server 110 and the information in the platform database 115.

Exemplary Embodiments of the Invention

Figure 2A:
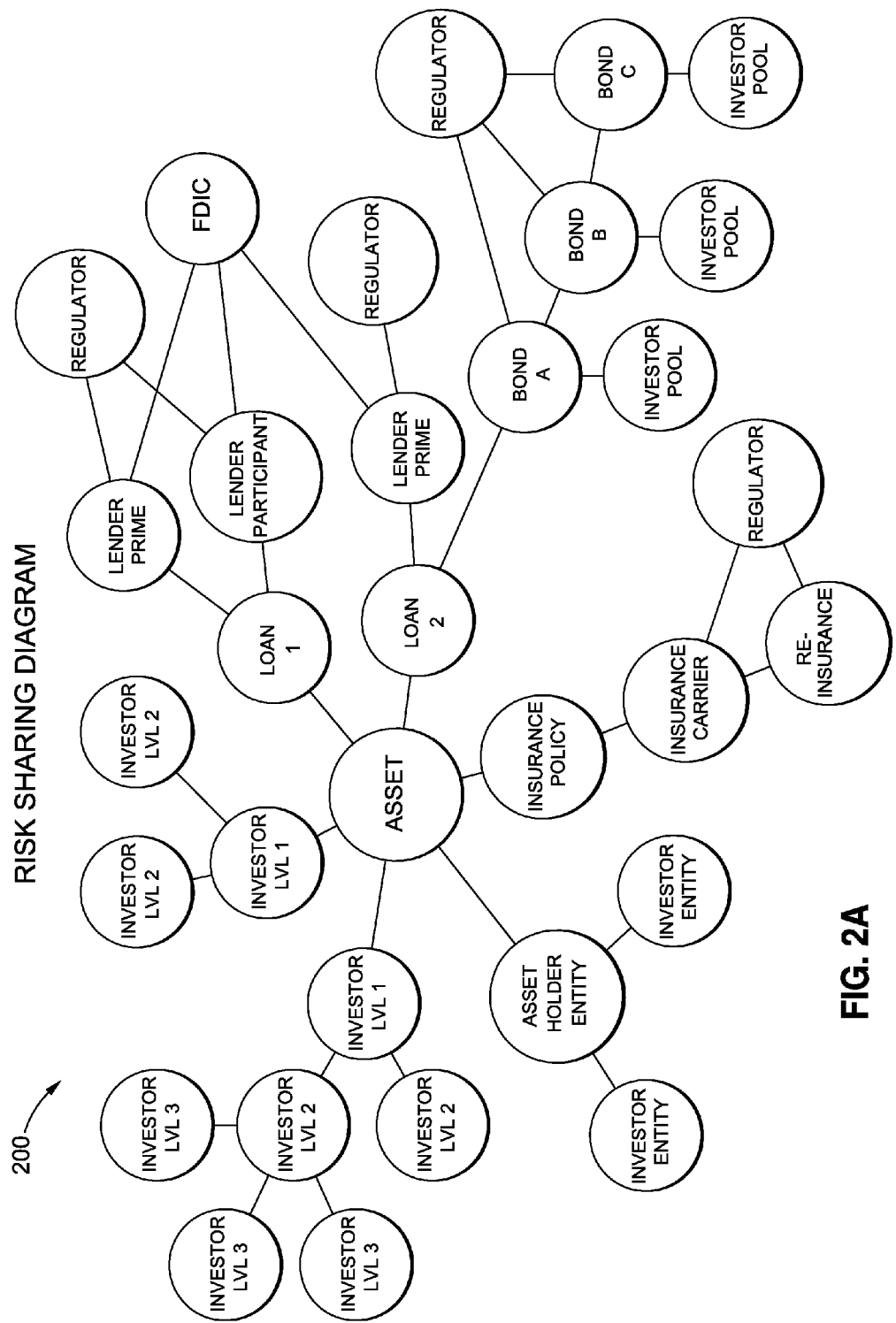
FIG. 2A depicts a graphical representation of how various entities may all share in the risk associated with a particular asset.

Referring now to FIG. 2A, depicted is a graphical representation of how various entities may all share in the risk associated with a particular asset. In particular, diagram 200 depicts how the risk is not merely contained to 'first level' investors, asset holders, lenders and insurance carriers. This is due to the fact that those 'first level' entities are in turn owned, insured and/or regulated by second level, third level, etc. entities as well. In this fashion, a transaction-based network is essentially defined around the asset, yet those risk-bearing entities presently have no means to share the information and documents that explain, define or are otherwise relevant to the asset's risk profile.

Unlike a social network, however, sharing information in a transaction-based network involves significant risk and consequences. Therefore, one aspect of the invention is to define a set of rules which govern the novel information sharing platform disclosed and claimed herein. First, in a transaction-based network information cannot simply be shared uniformly. Rather, information must be shared with only those entities which have a right or reason to need access. Therefore, a universal and infinitely flexible permissioning system must be applied across the platform so that all of the appropriate entities have the information they are entitled, but without violating any privacy rights or security.

Second, unlike in a social network, in a transaction-based network one cannot simply "unfriend" another entity that they are doing business with. Thus, as will be described in more detail below, another aspect of the invention is to impose the concept of ownership on the information which is shared across the platform. In a transaction-based network, money is not the only thing which is transferred between parties. Rather, ownership of the information that was used to underwrite a particular transaction is also transferred.

Finally, the present invention recognizes the concept of data provenance in that information cannot be trusted if it is provided or revised anonymously.

Figure 2B:
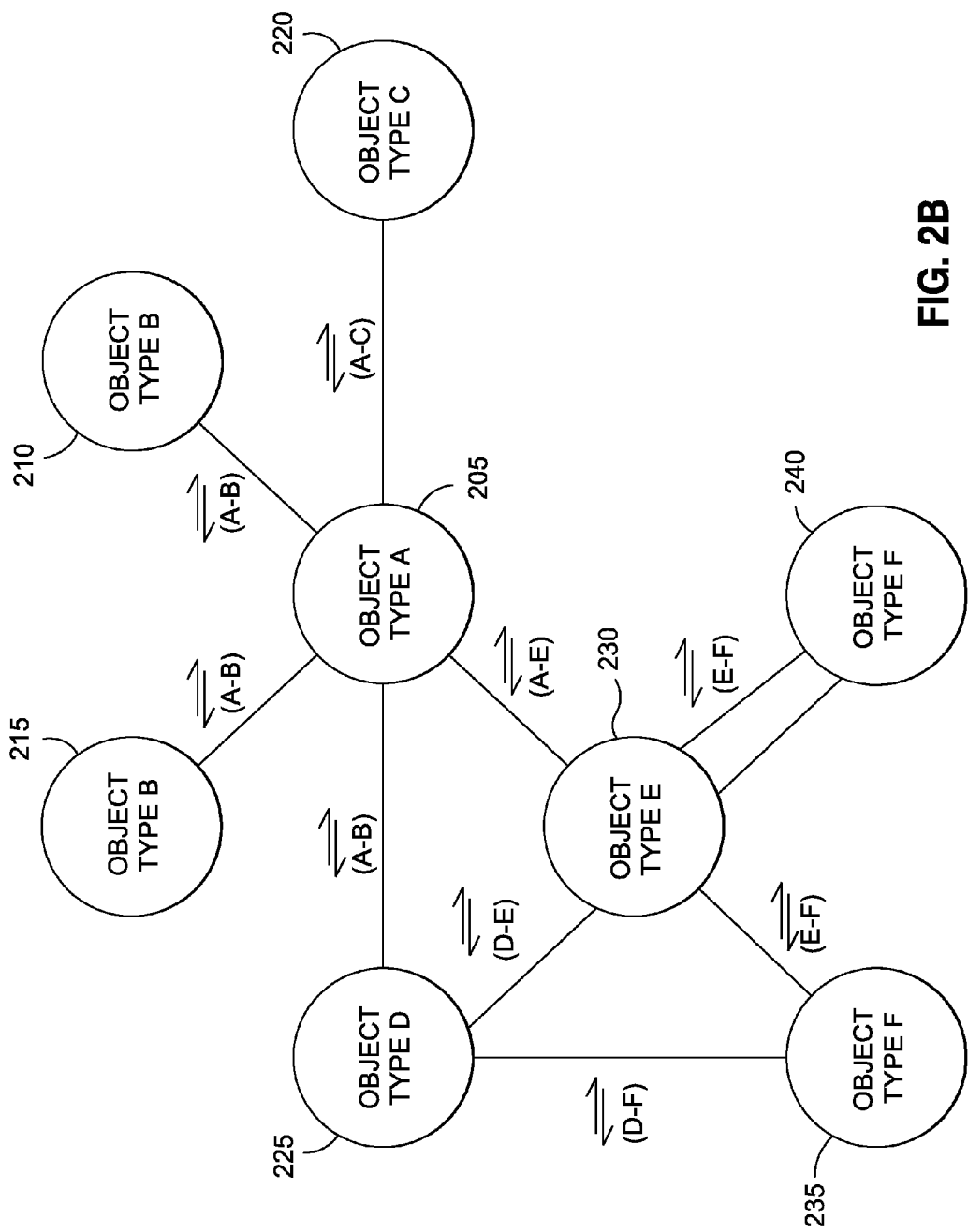
FIG. 2B is an object diagram illustrating how generic object relationships may exist within the disclosed standardized data sharing platform, whereby various relationships between specific objects have been defined.

Referring now to FIG. 2B, depicted is an object diagram illustrating how generic object relationships may exist within the disclosed standardized data sharing platform (e.g., on platform server 125 and/or database 135 of FIG. 1), whereby various relationships between specific objects have been defined. In particular, the diagram is depicted from the perspective of object 205 which may be an entity object, such as a borrower, insurer, guarantor, bank, investor, asset manager, or a non-entity object, such as an asset, loan, insurance policy, etc. Object 205 is of a particular type (i.e., Type A), while it has defined relationships to various other objects of varying types, including objects 210, 215, 220, 225 and 230. Additionally, object 230 itself has additional defined relationships with object 225, as well as with objects 235 and 240. Moreover, each object will be further defined or with a particular preferred owner. In the case of a loan object, for example, the preferred owner would be the lender, such as a bank, since it would have the legal obligation to maintain the information relating to the loan, and therefore is in the best position to maintain the integrity and accuracy of the information. The following a partial list of exemplary objects that may be defined, along with the associated preferred owner:

| Object | Associated Preferred Owner |
| --- | --- |
| Entity | Entity or individual |
| Loan | Lender |
| Asset | Asset Holder |
| Insurance policy | Insurance Broker |
| Offer | Buyer |
| Escrow | Escrow Officer |
| Appraisal | Appraiser |
| Bank | Bank Administrator |
| Brokerage | Brokerage Administrator |
| Equity fund | Fund Administrator |
| Insurance brokerage | Insurance Brokerage Administrator |
| Insurance carrier | Insurance Carrier Administrator |
| Property management company | Property management Administrator |
| Escrow company | Escrow Company Administrator |
| Title company | Title Company Administrator |

As also noted previously, data access and sharing may be carried out as a function of the role that a particular user assumes with respect to an underlying asset, for example. To that end, the following is again a partial list of the potential roles that the owners of objects may assume:

Asset holder
Partner—managing
Partner—limited
Borrower
Guarantor
Insured
Buyer
Seller
Broker
Administrator
Investor It is a further aspect of the invention for the owner of an object to be able to define a particular level of permission for each object field, file and/or contact. The various possible levels of permission or security categories may include the following:

Share
Never-share
Financials
Regulator
Disposition
Security categories 1-n

Figure 3:
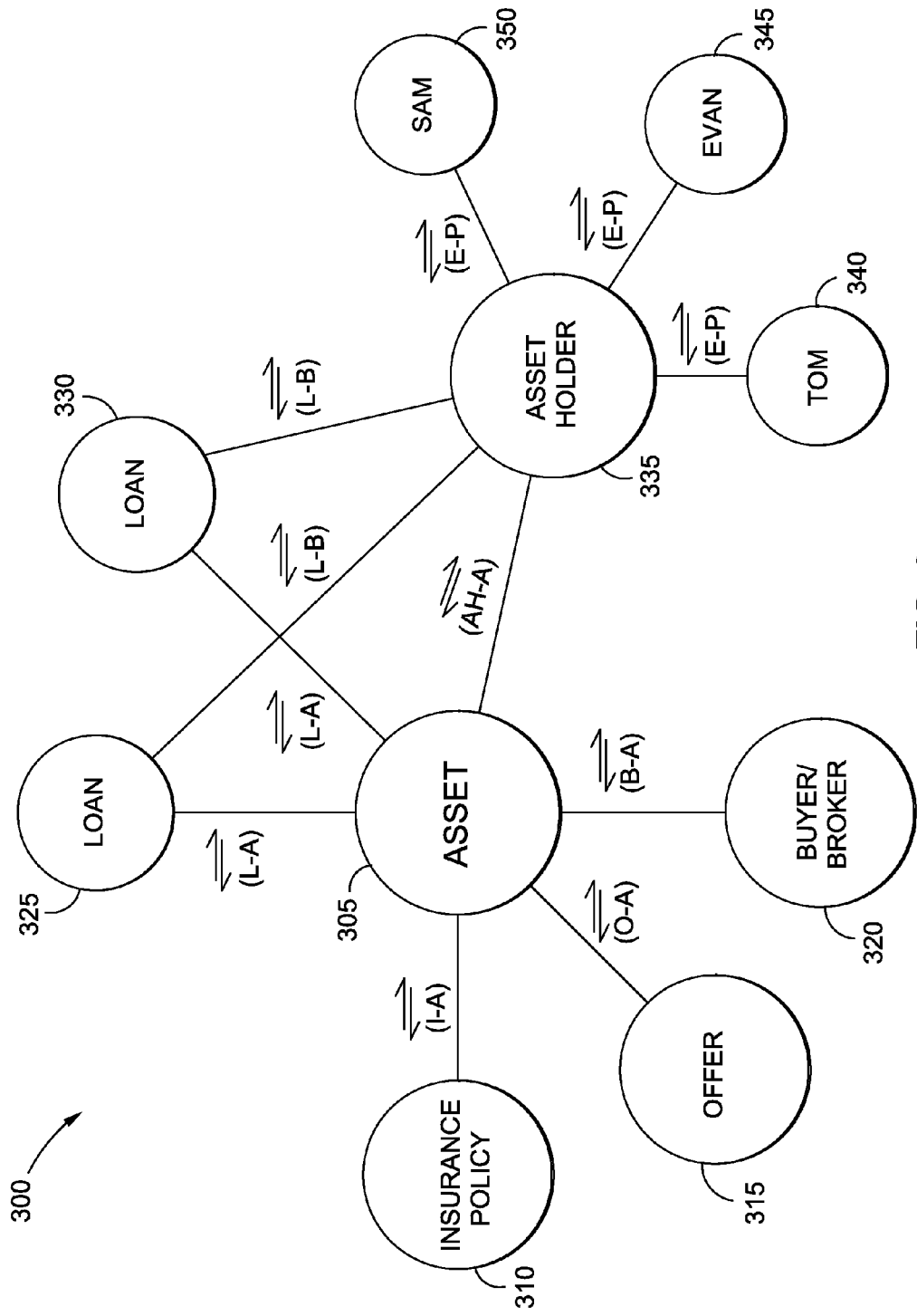
FIG. 3 is an example of how the object diagram of FIG. 2 may be arranged from an asset-centric perspective, consistent with the principles of the invention.

Referring now to FIG. 3, depicted is an example of the object diagram of FIG. 2 arranged from an asset-centric perspective. In particular, object diagram 300 depicts various object relationships from the perspective of asset object 305. As shown, the asset object 305 has a defined relationship with an insurance policy object 310 covering the underlying asset, an offer object 315 relating to an offer to purchase the underlying asset, a buyer/broker object 320 corresponding to a potential buyer or broker of the underlying asset, and a loan object 325 relating to a note being held for at least a portion of the asset underlying the asset object 305. In the depicted example of FIG. 3, a relationship between the asset object 305 and a second loan object 330 has also been defined, whereby an asset holder object 335 has defined relationships with each of the loan objects 325 and 330 and of course with the asset object 305 itself. In this particular embodiment, the asset holder may be a trust or other entity which is owned or controlled by three individuals, Sam, Evan and Tom. Therefore, objects 340, 345 and 350 may preferably also have defined relationships with the asset holder object 335, as well as a defined preferred owner.

With reference to the object diagram 300 of FIG. 3, the following table below illustrates the various relationships and permissions which, according to one example, have been granted/assigned by the preferred owner, which in this case is the asset holder (AH):

| Asset Object Fields | (A-AH) Asset Holder (preferred owner) (View/Edit) | (A-L) Loan (View) | (A-I) Insurance (View) | (A-B) Buyer (View) |
|---|---|---|---|---|
| Asset Type - House | X | X | X | X |
| Cost to Complete | X | X | | |
| Fair market Value | X | X | X | |
| Bedroom Count | X | X | X | X |
| APN | X | X | X | X |
| Year Built | X | X | X | X |
| Occupancy Rate | X | X | | X |
| # Units | X | X | X | X |
| ... | X | | X | |
| ... | X | | | |
| DOCS | | | | |
| Share | X | X | X | |
| Never Share | X | | | |
| Financial | X | X | | |
| Disposition | X | | | X |
| ... | X | | X | X |

Figure 4:
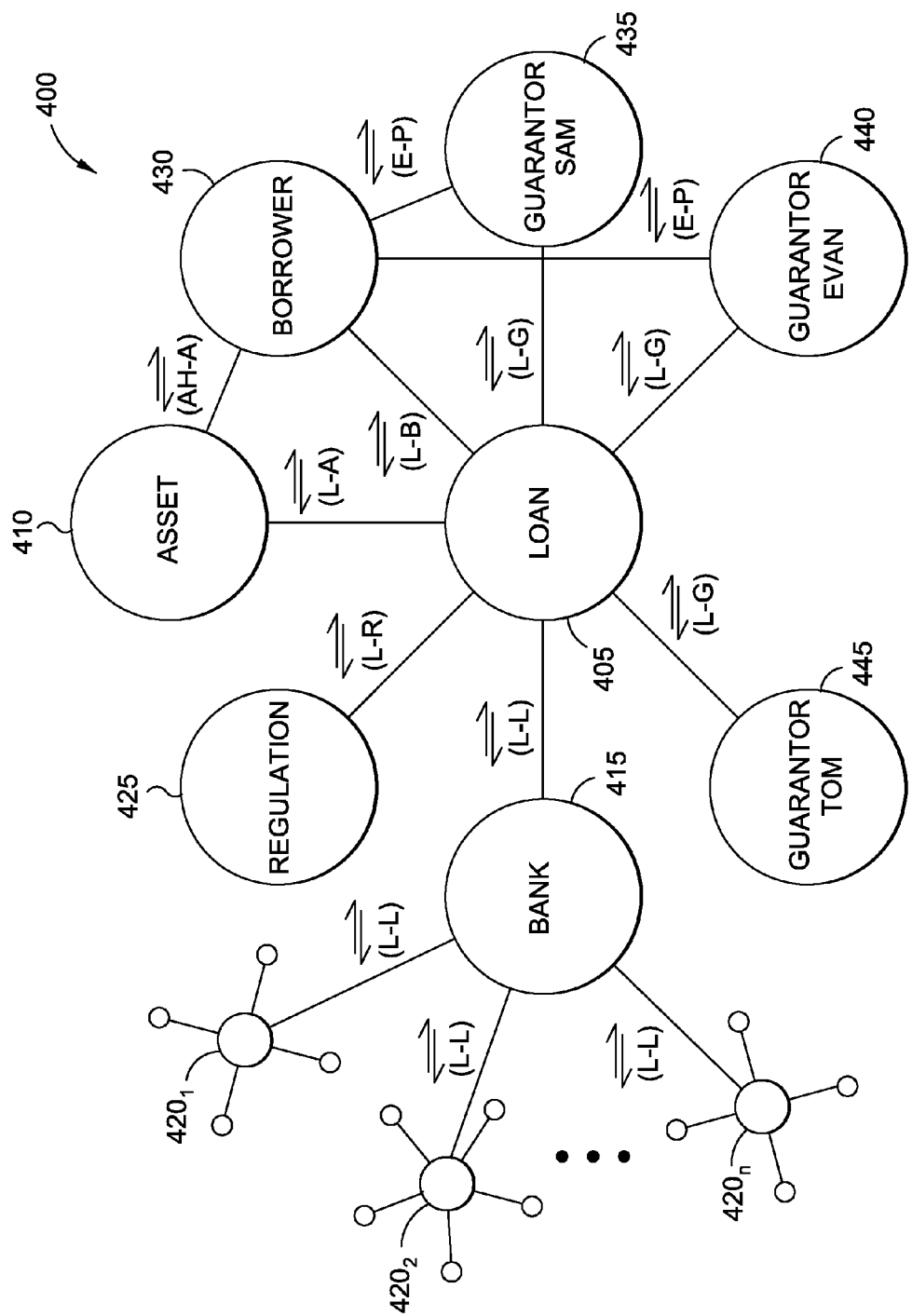
FIG. 4 is an example of how the object diagram of FIG. 2 may be arranged from a loan-centric perspective, consistent with the principles of the invention.

Referring now to FIG. 4, depicted is another example of the object diagram, although in this case arranged from a loan-centric perspective. In particular, object diagram 400 depicts various object relationships from the perspective of a loan object 405. As shown, the loan object 405 has a defined relationship with an asset object 410, which is associated with the asset to which the underlying loan of the loan object 405 was made. Additionally, the loan object 405 has a defined relationship to a bank object 415 relating to the entity which made the loan underlying the loan object 405. The bank will have made various other loans, and therefore the bank object 415 will have defined relationships with the loan objects $420_1$-$420_n$ corresponding to those various other loans.

Continuing to refer to FIG. 4, the loan object 405 also has defined relationships with a regulator object 425, a borrower object 430 corresponding to the underlying borrower on the loan, and guarantor objects 435, 440 and 445, corresponding to three of the borrower's guarantors.

With reference to the object diagram 400 of FIG. 4, the following table below illustrates the various relationships and permissions which, according to one example, have been granted/assigned by the preferred owner, which in this case is the lender (L):

| Loan Object Fields | (L-L) Lender (preferred owner) (View/Edit) | (L-B) Borrrower (View) | (L-G) Guarantor (View) | (L-R) Regulator (View) |
|---|---|---|---|---|
| Loan Number | X | X | X | X |
| Original Balance | X | X | X | X |
| Current Balance | X | X | X | X |
| Lien Position | X | X | X | X |
| Interest Rate | X | X | X | X |
| Performing Status | X | X | X | X |
| Audit Review | X | | | X |
| Audit Score | X | | | X |
| ... | X | | | X |
| ... | X | | | X |
| DOCS | | | | |
| Share | X | X | X | X |
| Never Share | X | | | |
| Financial | X | X | X | X |
| Disposition | X | | | X |
| ... | X | X | X | |

Figure 5:
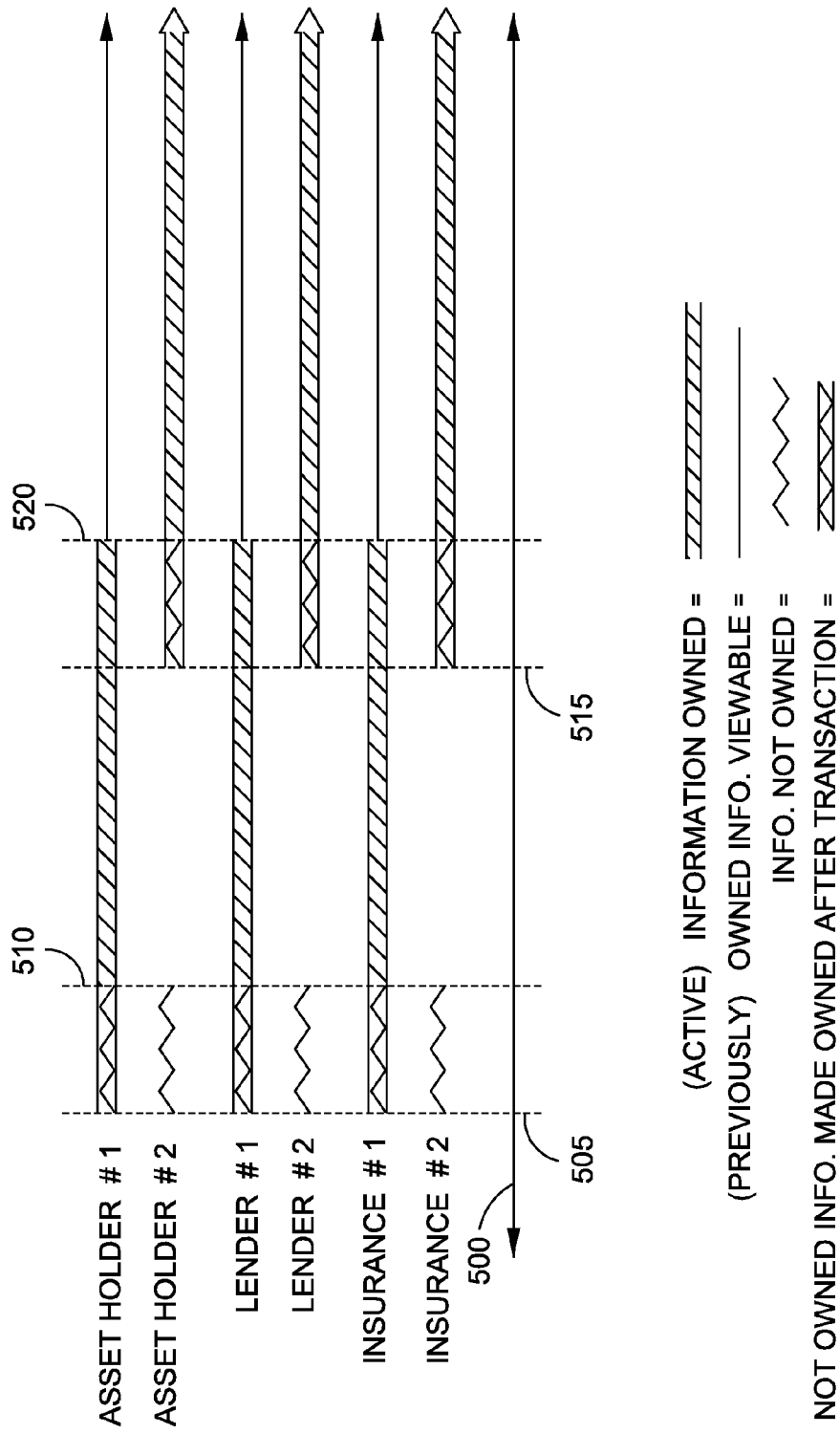
FIG. 5 provides a temporal representation of how data ownership and permission levels relating to an asset may change as a function of time and/or transaction events, in accordance with the principles of the invention.

FIG. 5 provides a temporal representation of how data ownership and permission levels relating to an asset may change as a function of time and/or transaction events. As previously mentioned, one aspect of the invention is to incorporate a temporal component to the concept of object ownership. For example, if a member sells an object to another member, the selling member would retain active permissions over the object up to the date of sale, and would indefinitely retain all information owned prior to that point. Conversely, the acquiring member would then receive ownership once the transaction was completed with active permission to edit the object from that point forward, as well as of course access to all information about the object from the closing of the transaction. An owner retains ownership to all of the data over the time period in which that owner owned the object. Thus, in at least one embodiment, all data fields and documents in the platform to be time stamped. This allows the information regarding a particular data object to persist though time and through various owners. Such functionality allows more rigorous analysis of asset/entity trends and behaviors.

In the particular example of FIG. 5, timeline 500 shows how ownership and access to an asset object may be affected over time and in response to one or more transactions involving the underlying asset of the asset object. In the example of FIG. 5, the asset first goes to market at time 505. A corresponding asset object is created on the novel platform disclosed and claimed herein, i.e., server platform 125 and database 135 of FIG. 1. At time 510, Asset Holder #1 purchases the asset with a loan from Lender #1 and takes out an insurance policy on the asset from Insurance company #1. From that time 510 forward, Asset Holder #1 is the preferred owner of the asset object (since he/she owns the underlying asset), and has granted viewing rights of the asset object to both Lender #1 and Insurance company #1. Additionally, the Asset Holder #1 will be given access to previous information about the asset, beginning from the time that the asset went to market at time 505.

Continuing to refer to FIG. 5, Asset Holder #1 decides to put the asset up for sale at time 515. However, until an actual transaction occurs, the Asset Holder #1 will continue to own and be able to edit/view the asset object, while Lender #1 and Insurance company #1 will similarly continue to have access to the asset object.

At time 520, Asset Holder #2 purchases the asset from Asset Holder #1. At that point, Lender #1 is paid off and the policy from Insurance company #1 is canceled. In connection with that transaction, Asset Holder #2 will take out a loan for the asset from Lender #2 and will also take out its own policy from Insurance company #2. From that point, Asset Holder #2 owns the asset object (since he/she now owns the underlying asset) and is free to grant access rights to others, which in this case includes Lender #2 and Insurance company #2. This will continue until the Asset Holder #2 transfers the asset or gives away its ownership of the asset object. Also, each of Asset Holder #2, Lender #2 and Insurance company #2 are given access to the asset object, as it existed from time 515 when it went back on the market.

FIG. 5 illustrates how ownership and access to the asset object may change over time and as a function of the underlying asset being transferred. More particularly, it illustrates the concept that the asset object (like all objects on the platform) persist over time in different states. For example, even after time 520 when the underlying asset is sold, Asset Holder #1 will have access to the asset object, but only as it existed between time 505 and 520. Any changes made to the asset object after time 520, will not be known to Asset Holder #1 and will not be reflected in the instantiation of the asset object which is accessible by Asset Holder #1. Similarly, Lender #1 and Insurance company #1 will be able to access, through the platform, the asset object, but only as it existed during the time when the loan and insurance policy, respectively, were active. Conversely, when Asset Holder #2 logs in and accesses the asset object, the instantiation of the asset object which it can view and edit will correspond to the timeframe beginning at time 515. In this fashion, the information about an asset can be easily shared, but its ownership can be tightly correlated to real world events, such as canceling insurance policies, paying off loans, selling assets, etc.

Another aspect of the disclosed platform is to maintain data integrity by, not only defining the ownership of the data as a function of time, but also to ensure that no data is anonymous. In particular, all information contained in the data objects is associated with the member who provide the information, and all edits to the data objects are similarly associated with the corresponding editing member(s).

Figure 6:
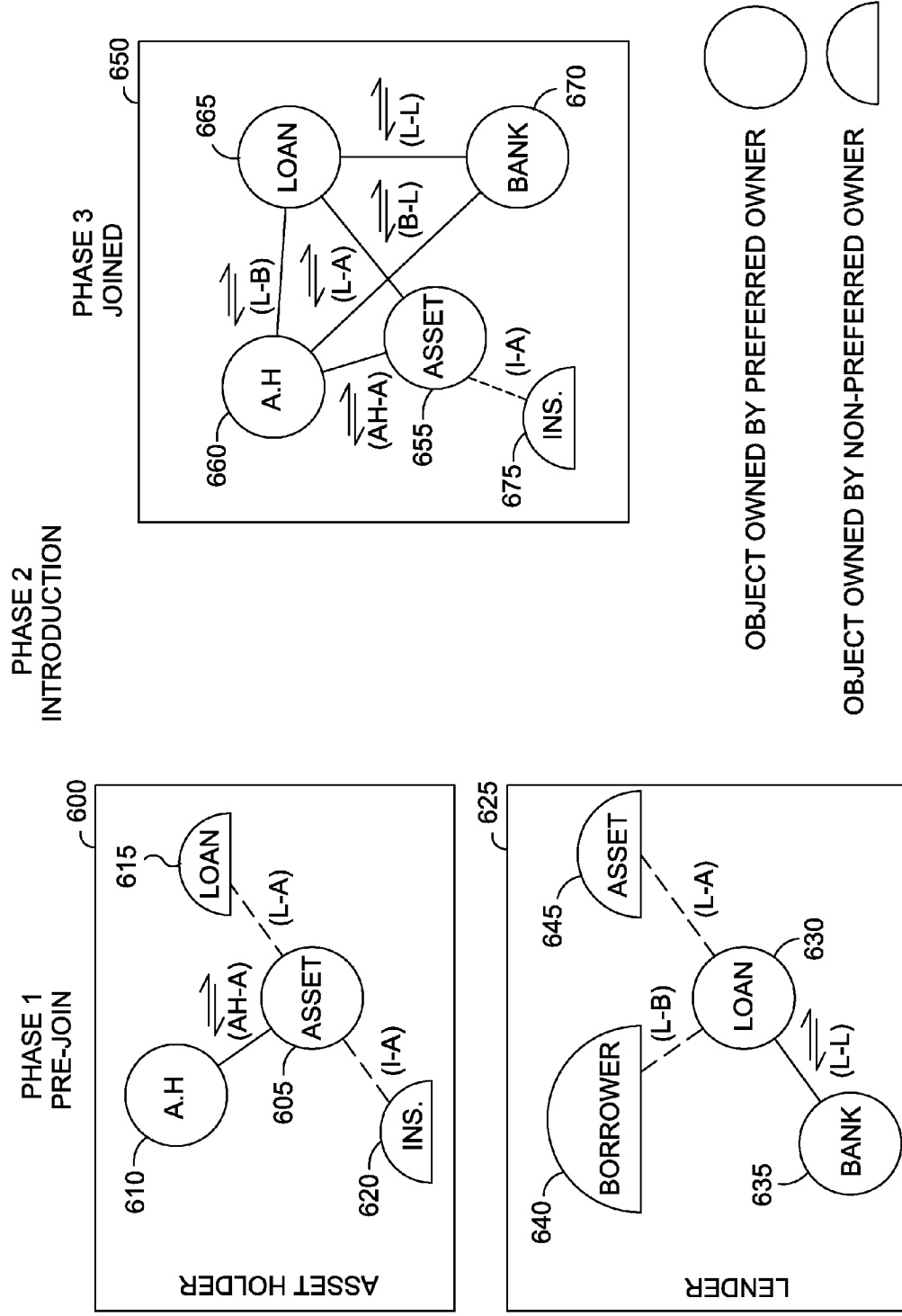
FIG. 6 illustrates one example of how multiple occurrences of an asset may be joined in accordance with the principles of the invention.

Referring now to FIG. 6, the novel platform disclosed herein is configured to allow new objects to be created, joined to other objects, and controlled (owned) by different entities. Phase 1 of FIG. 1 illustrates a pre-join phase in which an asset-centric relationship 600 and a lender-centric relationship 625 need to be joined. In particular, an asset holder has taken out a loan and an insurance policy on the underlying asset, and has created objects for each of the asset holder, loan and insurance policy, with the corresponding relationships defined, as shown in the asset-centric relationship 600. However, the lender (bank 635) has also created objects (e.g., via platform server 125) for the loan, including its own asset 625, loan object 630, bank object 635 and borrower object 640. This results in some duplicative information and objects. It also results in certain instantiations of the objects being owned by a non-preferred owner, i.e., loan 615 owned asset 605 or asset 645 owned by loan 630, etc.

To avoid effort and information duplication and improve efficiency, another aspect of the novel platform disclosed and claimed herein is to recognize when such duplicative objects have been created, and to automatically introduce (Phase 2) the owners of the affected objects (i.e., asset 605 and loan 630) such that the parties can agree to join and assign permissions to the various ancillary objects. To that end, Phase 3 of FIG. 6 depicts the post-joined phase of the asset-centric relationship 600 and the lender-centric relationship 625 such that duplicative objects have been eliminated and, to the extent possible, all objects are owned by their preferred owner. Note that the preferred owner for the insurance policy 675 would be the insurance company. However, since the insurance company's policy object has not yet been joined, this particular instantiation of the policy 675 remains with a non-preferred owner.

With respect to process of reconciling information, it may be preferable for the preferred owner to perform such reconciliation. This may be done by providing the preferred owner with administrative and editing authority. To determine who the preferred owner is for a particular object, the difference between users of information and creators or owners of information should be recognized. That is, those entities which create and are responsible for maintaining certain information will likely be considered the preferred owner.

It should be appreciated that all of the above-described object information and relationships will be experienced by members of the novel data sharing platform in the form of computer-generated GUIs which are generated by the platform's servers and viewed by users on a workstation that is running, for example, a browser-type application, or may alternative be accessible using a dedicated client-side application. To that end, FIG. 7 depict one example of a GUI 700 which has been generated by the platform server (e.g., platform server 125) based on object data, defined relationships and member ownership/access information that is stored in a database (e.g., platform database 135). In particular, GUI 700 displays information relating to a real estate asset from an asset-centric perspective. The information disclosed about the real estate asset in GUI 700, including the variously accessible documents, pictures and tabbed information, collectively comprises the overall asset object. As the owner of this particular asset object, the user could also use GUI 700 to edit the asset object or grant additional access or ownership rights to the object. As previously described, the object is essentially a data set that resides on a database (e.g., platform database 135), but which is permissioned, maintained and managed according to the novel principles disclosed herein.

Figure 8:
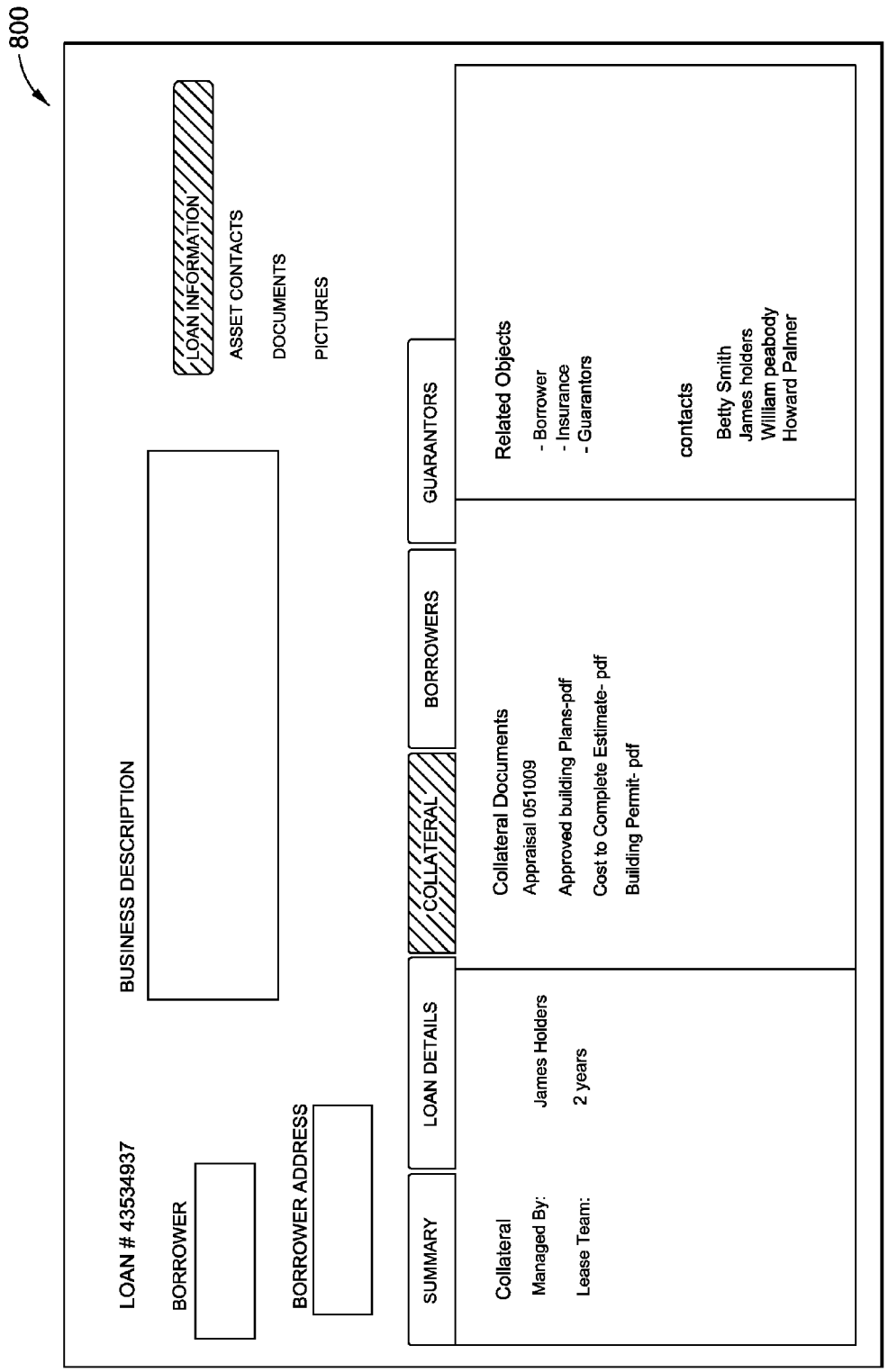
FIG. 8 depicts another example of a graphical user interface configured to access one or more aspects of the standardized platform environment, as disclosed herein.

Referring now to FIG. 8, depicted is another example of a GUI 800 which has been generated by the platform server (e.g., platform server 125) based on object data, defined relationships and member ownership/access information that is stored in a database (e.g., platform database 135). In this example, however, GUI 800 displays information relating to a real estate asset but from a loan-centric perspective. Thus, GUI 800, including the variously accessible documents, pictures and tabbed information, collectively comprises the overall loan object, which can be both viewed by a member and edited by its owner via GUI 800.

Figure 9:
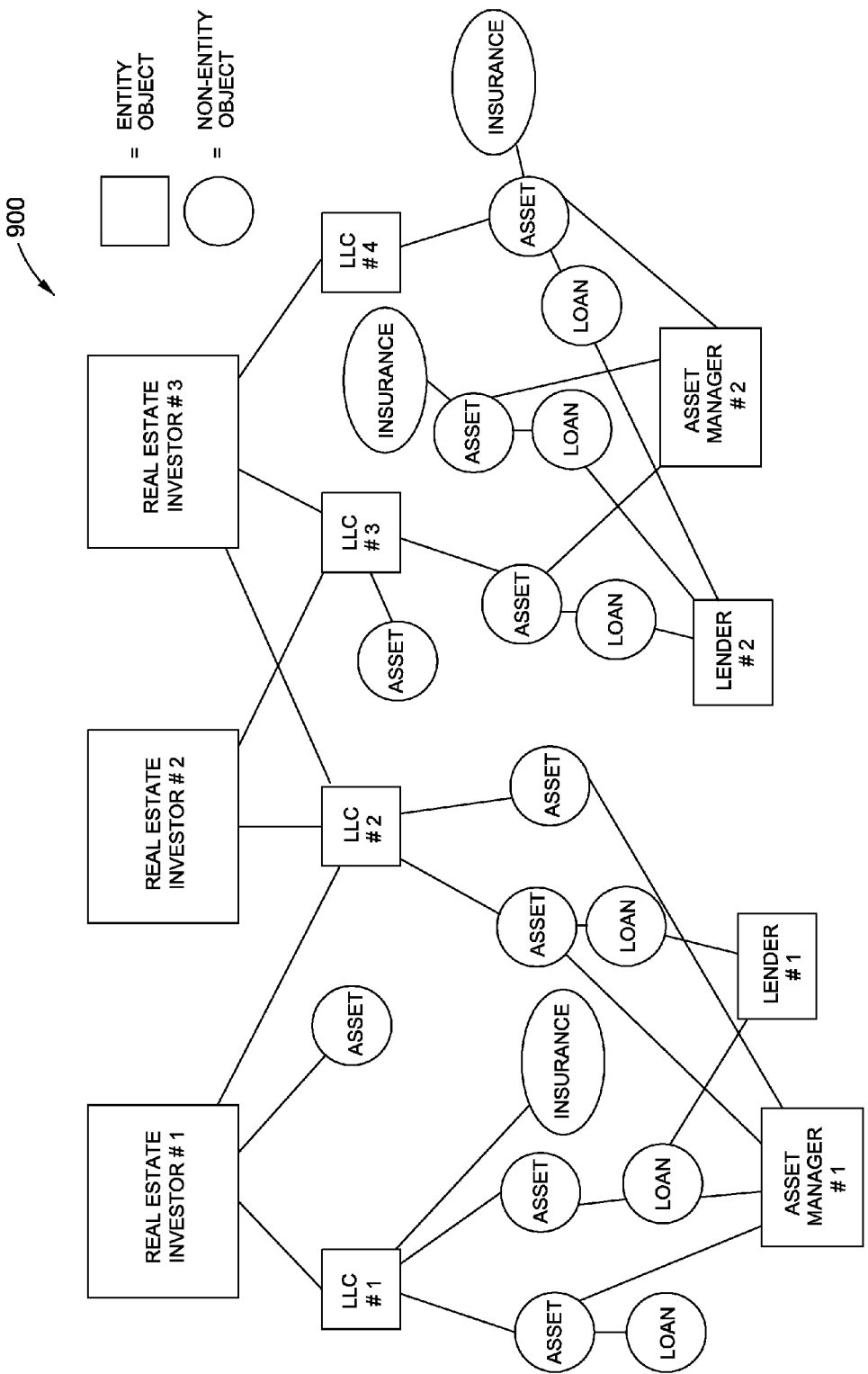
FIG. 9 depicts an object diagram of one example of a real estate investment relationship map, as it may exist within the standardized platform environment.

Referring now to FIG. 9, depicted is an object diagram 900 for a real estate investment arrangement in which entity objects for Real Estate Investors 1-3 are associated with entity objects for investment LLCs 1-4, which in turn have a defined relationship to non-entity objects, such as the variously owned assets, loan and insurance policies underlying the investment arrangement. Each of the Real Estate Investors 1-3 and/or investment LLCs 1-4 may have a member organization network (e.g., organization network 105 of FIG. 1) which is configured to access the novel standardized data sharing platform (e.g., platform server 125 and database 135) over a network connection (e.g., network 130) using a GUI displayed on a workstation display.

Figure 10:
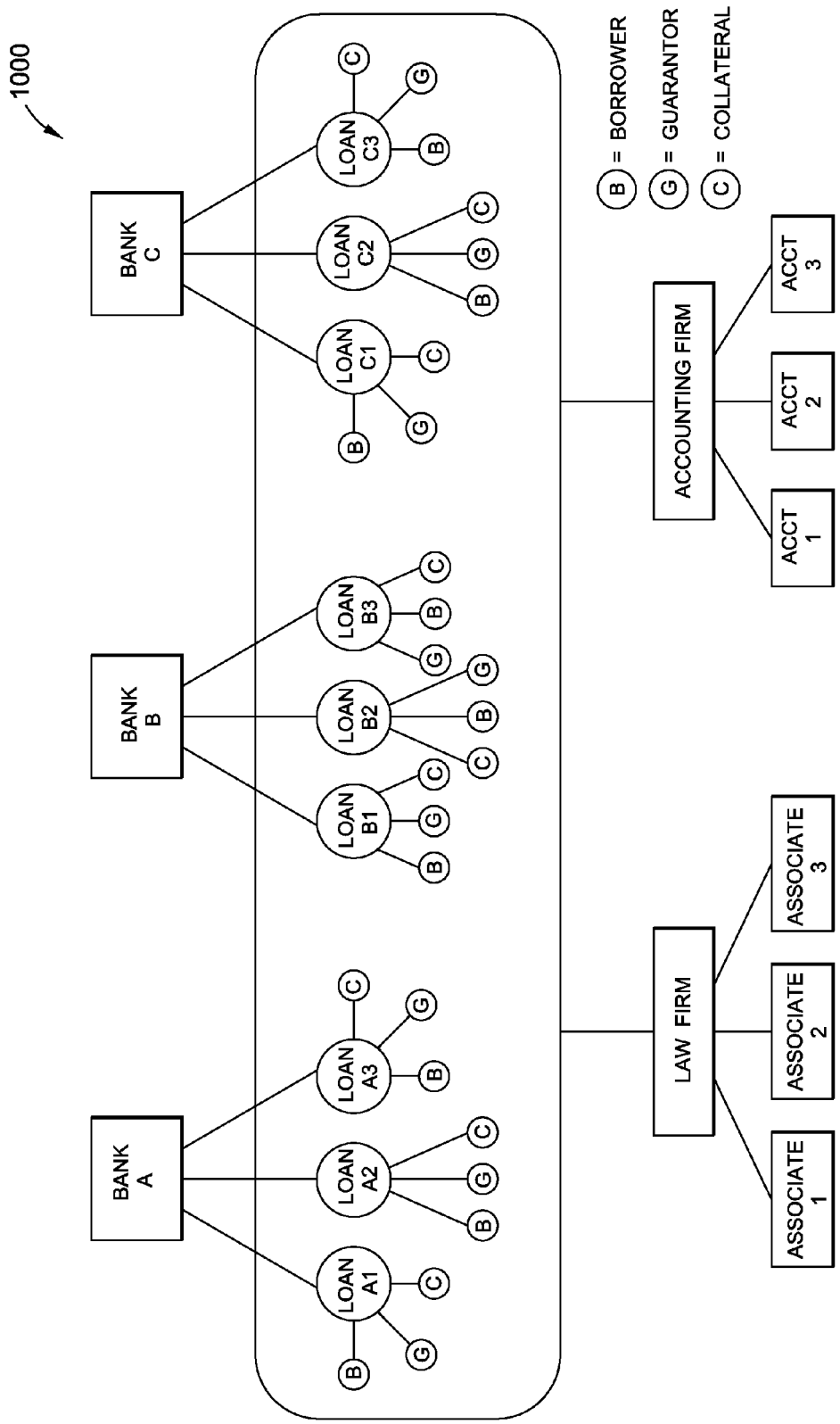
FIG. 10 illustrates how asset-related data may be accessed from within the standardized platform environment across different industries, in accordance with the principles of the standardized platform disclosed herein.

Referring now to FIG. 10, depicted is another object diagram 1000 in which entity objects corresponding to Banks A, B and C have defined object relationships with their respective loan portfolios. However, by using the above-described permissioning protocols and object definitions entities from any industry can be selectively granted access to the loan objects irrespective of which bank is holding the loan. Thus, in the event that each of Banks A, B and C use the same law firm, accounting firm, etc., those vendors can be granted access to the loan objects, irrespective of in which bank's portfolio the underlying loan resides. It should further be appreciated that, within each particular vender, only selective employees may be granted access to the platform and/or the particular loan object information. In this fashion, data can be selectively shared across entirely different industries utilizing the above-described novel platform.

Figure 11:
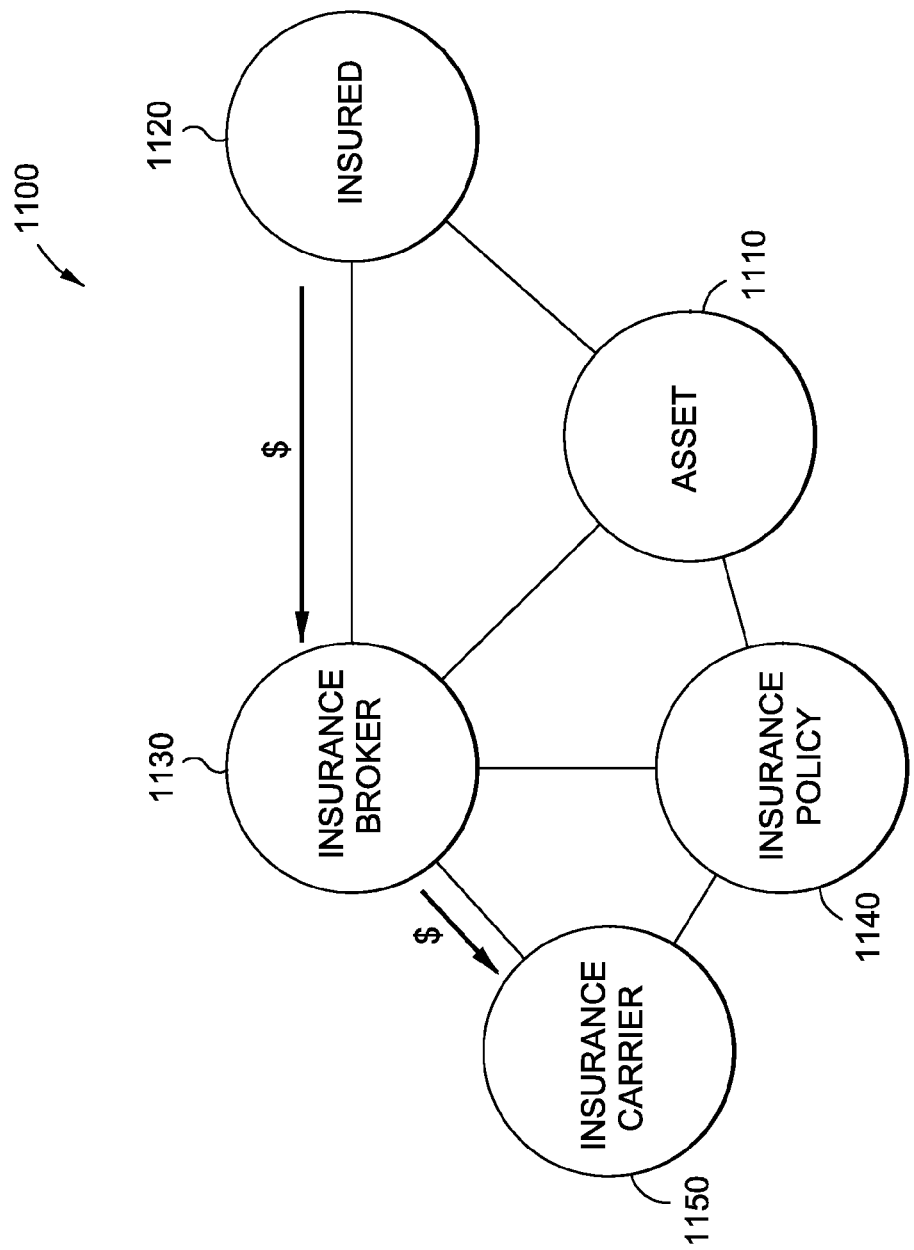
FIG. 11 depicts a diagram of one example of a financial transaction relationship map, as it may exist within the standardized platform environment.

Finally, FIG. 11 illustrates how the novel platform may be used to facilitate financial transactions. In this example, the underwriting information relating to a particular asset 1110 may be provided over the platform (e.g., to server 125). An insurance policy 1140 is presented to the insured 1120 via the platform. The insured 1120 may then electronically pay the insurance premium to the insurance carrier 1150, via the broker 1130, using its member account on the platform. The broker's member account can be established such that its commission is similarly withheld from the insurance premium, using the platform architecture.

A platform configured in accordance with the principles of the invention may further facilitate communication between users/owners regarding a particular object. These communications may be performed within the platform and archived within the platform. The security and permission levels associated with communication information may be handled according to the same methodology as other data and files.

Still another aspect of the invention may be to facilitate the transacting of money between users/owners within the platform, as it relates to the real world (i.e., sale of an asset, a loan, an appraisal, etc.). Members of the platform may use the platform itself to enter into financial agreements, agree to payment terms and execute payment through any known electronic means.

The platform may also allow users/owners to create and assign action items to other team members. These action items may then be tracked, reported and viewed based on role and/or permission levels, for example.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A standardized, data sharing platform comprising:
a network;
a database; and
a server coupled to the database and to the network, wherein the server includes processing circuitry to execute programming code to,
define a plurality of data objects for both entities and non-entities, wherein each of the plurality of data objects for entities comprises information that corresponds to specific entity types, while each of the plurality of data objects for non-entities comprises information that corresponds to specific tangible items;
store the plurality of data objects in a platform database;
populate an asset object, from the plurality of data objects, with information corresponding to an underlying tangible asset provided by a preferred owner of the asset object, wherein the preferred owner of the asset object varies over time in accordance with ownership of the underlying tangible asset;
defining relationships between the asset object, the preferred owner and one or more of the other plurality of data objects, including at least one entity object, wherein said relationships are defined as a function of one or more commercial arrangements between the preferred owner and one or more other entities, wherein the at least one entity object corresponds to the one or more other entities; and
allow one or more other entities the right to access said asset object over the network and in accordance with said defined relationships and with permissions defined by said preferred owner,
wherein, following a transfer of the underlying tangible asset from a first owner to a second owner, the first owner retains ownership of the asset object as it existed prior to said transfer, while the second owner obtains ownership of the asset object as it exists following said transfer.

2. The platform of claim 1, wherein each of the plurality of data objects is an information set comprising data fields, defined relationships to other data objects, and entity permission levels.

3. The platform of claim 2, wherein the asset object further comprises documents relating to the underlying tangible asset.

4. The platform of claim 1, wherein said specific entity types comprise at least one of a buyer, seller, borrower, insurer, insured, guarantor, bank, investor and asset manager.

5. The platform of claim 1, wherein said underlying tangible asset comprises one of real estate, a loan and an insurance policy.

6. The platform of claim 1, wherein only the preferred owner is allowed to modify and grant access permissions to the asset object.

7. A method for providing a standardized, data sharing platform comprising:
defining, by a platform server, a plurality of data objects for both entities and non-entities, wherein each of the plurality of data objects for entities comprises information that corresponds to specific entity types, while each of the plurality of data objects for non-entities comprises information that corresponds to specific tangible items;
storing, by the platform server, the plurality of data objects in a platform database;
populating, by the platform server, an asset object, from the plurality of data objects, with information corresponding to an underlying tangible asset which is provided by a preferred owner of the asset object over a network connection, wherein ownership of the asset object varies over time in accordance with ownership of the underlying tangible asset;
defining, by the platform server, relationships between the asset object, the preferred owner and one or more of the other plurality of data objects, including at least one entity object, wherein said relationships are defined as a function of one or more commercial arrangements between the preferred owner and one or more other entities, wherein the at least one entity object corresponds to the one or more other entities; and
allowing one or more other entities the right to access said asset object over the network and in accordance with said defined relationships and with permissions defined by said preferred owner,
wherein, following a transfer of the underlying tangible asset from a first owner to a second owner, the method further comprises causing the first owner to retain ownership of the asset object as it existed prior to said transfer, and causing the second owner to obtain ownership of the asset object as it exists following said transfer.

8. The method of claim 7, wherein each of the plurality of data objects is an information set comprising data fields, defined relationships to other data objects, and entity permission levels.

9. The method of claim 8, wherein the asset object further comprises documents relating to the underlying tangible asset.

10. The method of claim 7, wherein said specific entity types comprise at least one of a buyer, seller, borrower, insurer, insured, guarantor, bank, investor and asset manager.

11. The method of claim 7, wherein said underlying tangible asset comprises one of real estate, a loan and an insurance policy.

12. The method of claim 7, further comprising allowing only the preferred owner to modify and grant access permissions to the asset object.

13. The platform of claim 1, wherein the preferred owner of the asset object has responsibility of maintaining information relating to the underlying tangible asset.

14. The method of claim 7, wherein the preferred owner of the asset object has responsibility of maintaining information relating to the underlying tangible asset.

15. The platform of claim 1, wherein ownership of the asset object by the preferred owner is defined, for a given period of time, by ownership of the underlying tangible asset by the preferred owner over said period of time.

16. The method of claim 7, wherein ownership of the asset object by the preferred owner is defined, for a given period of time, by ownership of the underlying tangible asset by the preferred owner over said period of time.

17. The platform of claim 1, wherein changes made to the asset object after said transfer of the underlying tangible asset are not reflected in the asset object as it existed before said transfer and owned by the first owner, but are reflected in the asset object as it exists following the transfer and owned by the second owner.

18. The method of claim 7, wherein changes made to the asset object after said transfer of the underlying tangible asset are not reflected in the asset object as it existed before said transfer and owned by the first owner, but are reflected in the asset object as it exists following the transfer and owned by the second owner.

* * * * *